(12) United States Patent
Schroeder et al.

(10) Patent No.: US 6,723,972 B2
(45) Date of Patent: Apr. 20, 2004

(54) METHOD AND APPARATUS FOR PLANAR ACTUATION OF A FLARED SURFACE TO CONTROL A VEHICLE

(75) Inventors: Wayne K. Schroeder, Dallas, TX (US); Johnny Edward Banks, Venus, TX (US)

(73) Assignee: Lockheed Martin Corporation, Grand Prairie, TX (US)

( * ) Notice: Subject to any disclaimer, the term of this patent is extended or adjusted under 35 U.S.C. 154(b) by 186 days.

(21) Appl. No.: 10/011,520

(22) Filed: Nov. 5, 2001

(65) Prior Publication Data

US 2002/0079404 A1 Jun. 27, 2002

Related U.S. Application Data

(60) Provisional application No. 60/257,510, filed on Dec. 22, 2000.

(51) Int. Cl.[7] ............................................. F42B 10/00
(52) U.S. Cl. ........................................ 244/3.3; 244/3.24
(58) Field of Search ............................... 244/3.21, 3.22, 244/3.24, 3.27, 3.3

(56) References Cited

U.S. PATENT DOCUMENTS

| | | | | |
|---|---|---|---|---|
| 4,296,895 A | * | 10/1981 | Pazmany | 244/3.29 |
| 4,438,893 A | * | 3/1984 | Sands et al. | 244/3.21 |
| 4,600,167 A | * | 7/1986 | Kastenhuber et al. | 244/3.28 |
| 4,944,226 A | * | 7/1990 | Wedertz et al. | 102/476 |
| 6,247,666 B1 | * | 6/2001 | Baker et al. | 244/3.21 |
| 6,360,987 B1 | * | 3/2002 | Sallaee et al. | 244/3.21 |
| 6,502,785 B1 | * | 1/2003 | Teter et al. | 244/3.22 |

* cited by examiner

*Primary Examiner*—Charles T. Jordan
*Assistant Examiner*—Stephen Holzen

(57) ABSTRACT

The invention is, in its various embodiments and implementations, a method and apparatus for planar actuation of a flared surface to control a vehicle. In one aspect, the invention comprises an apparatus for controlling a vehicle capable of moving through a fluid medium. The apparatus includes a flare; a planar yoke operably associated with the flare; a plurality of actuators capable of moving the planar yoke to manipulate the flare through the operable association between the planar yoke and the flare; and a load bearing structure through which the translating means imparts a moment from the flare to the vehicle. In a second aspect, the invention comprises a method for controlling the maneuvering of a vehicle capable of moving through a fluid medium. The method includes moving a planar yoke to deflect at least a portion of a flare.

28 Claims, 13 Drawing Sheets

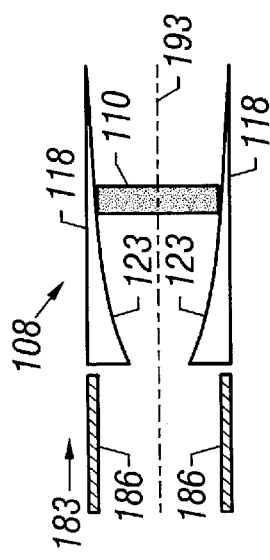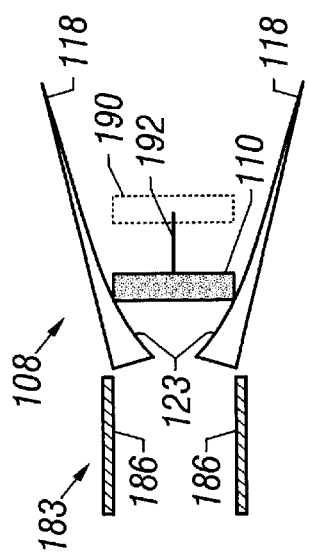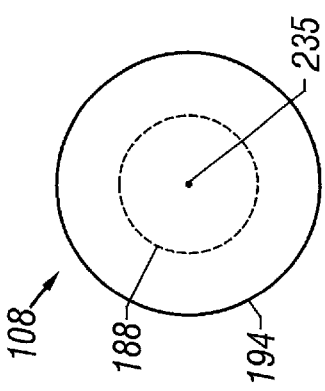
FIG. 10A  FIG. 10B  FIG. 10C
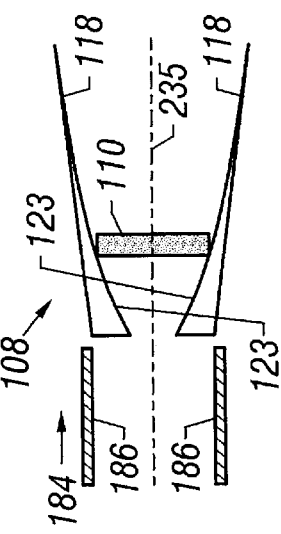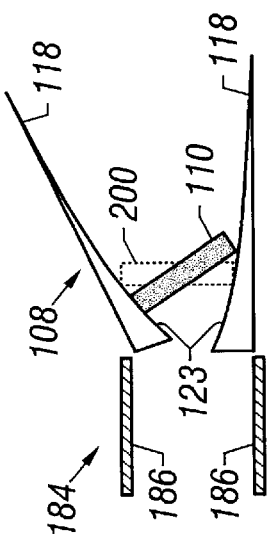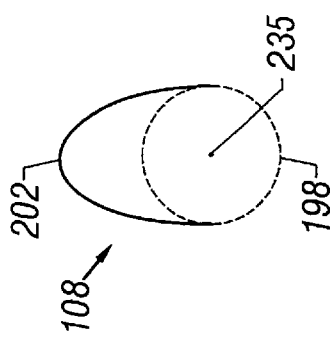
FIG. 11A  FIG. 11B  FIG. 11C

METHOD AND APPARATUS FOR PLANAR ACTUATION OF A FLARED SURFACE TO CONTROL A VEHICLE

This application claims the benefit of the earlier effective filing date of our co-pending, commonly assigned, provisional Application Serial No. 60/257,510, filed Dec. 22, 2000, entitled "Method and Apparatus for Planar Actuation of a Flared Surface to Control a Vehicle."

BACKGROUND OF THE INVENTION

1. Field of the Invention

This invention relates in general to the field of maneuver control of a vehicle traveling through a fluid medium and, more particularly, to a method and apparatus to control one or more of a vehicle's center-of-pressure, pitch, and yaw motion by actively controlling the shape of a flared surface using planar actuation.

2. Description of the Related Art

One application that exhibits an immediate need for the benefits provided by this invention is a missile. A missile can be described as an elongated body that travels through a fluid medium. The control of a missile flying in the atmosphere is accomplished by imparting a moment to rotate the nose of the missile to an angle with the oncoming flow. Moments can be generated with aerodynamic devices, e.g., canards or fins, or propulsive devices, e.g., thrusters. This invention actively controls an aerodynamic device, or more particularly a flare.

A traditional approach for active control of a flare surface splits the flare into several petals and provides actuation for each petal. This approach would most likely maintain the flare in a nominally deflected position and deflect a petal or combination of petals outward into the fluid flow to perform pitch and yaw maneuvers.

The present invention is directed to resolving, or at least reducing, one or all of the problems mentioned above.

SUMMARY OF THE INVENTION

The invention is, in its various embodiments and implementations, a method and apparatus for planar actuation of a flared surface to control a vehicle. In one aspect, the invention comprises an apparatus for controlling a vehicle capable of moving through a fluid medium. The apparatus includes a flare; a planar yoke operably associated with the flare; a plurality of actuators capable of moving the planar yoke to manipulate the flare through the operable association between the planar yoke and the flare; and a load bearing structure through which the translating means imparts a moment from the flare to the vehicle. In a second aspect, the invention comprises a method for controlling the maneuvering of a vehicle capable of moving through a fluid medium. The method includes moving a planar yoke to deflect at least a portion of a flare.

BRIEF DESCRIPTION OF THE DRAWINGS

The invention may be understood by reference to the following description taken in conjunction with the accompanying drawings, in which like reference numerals identify like elements, and in which:

FIGS. 10A–10C conceptually illustrate the operation of the embodiment in FIGS. 1, 2 to control of the vehicle's center-of-pressure;

FIGS. 11A–11C conceptually illustrate the operation of the embodiment in FIGS. 1, 2 to control the pitch and/or yaw.

Figure 1:
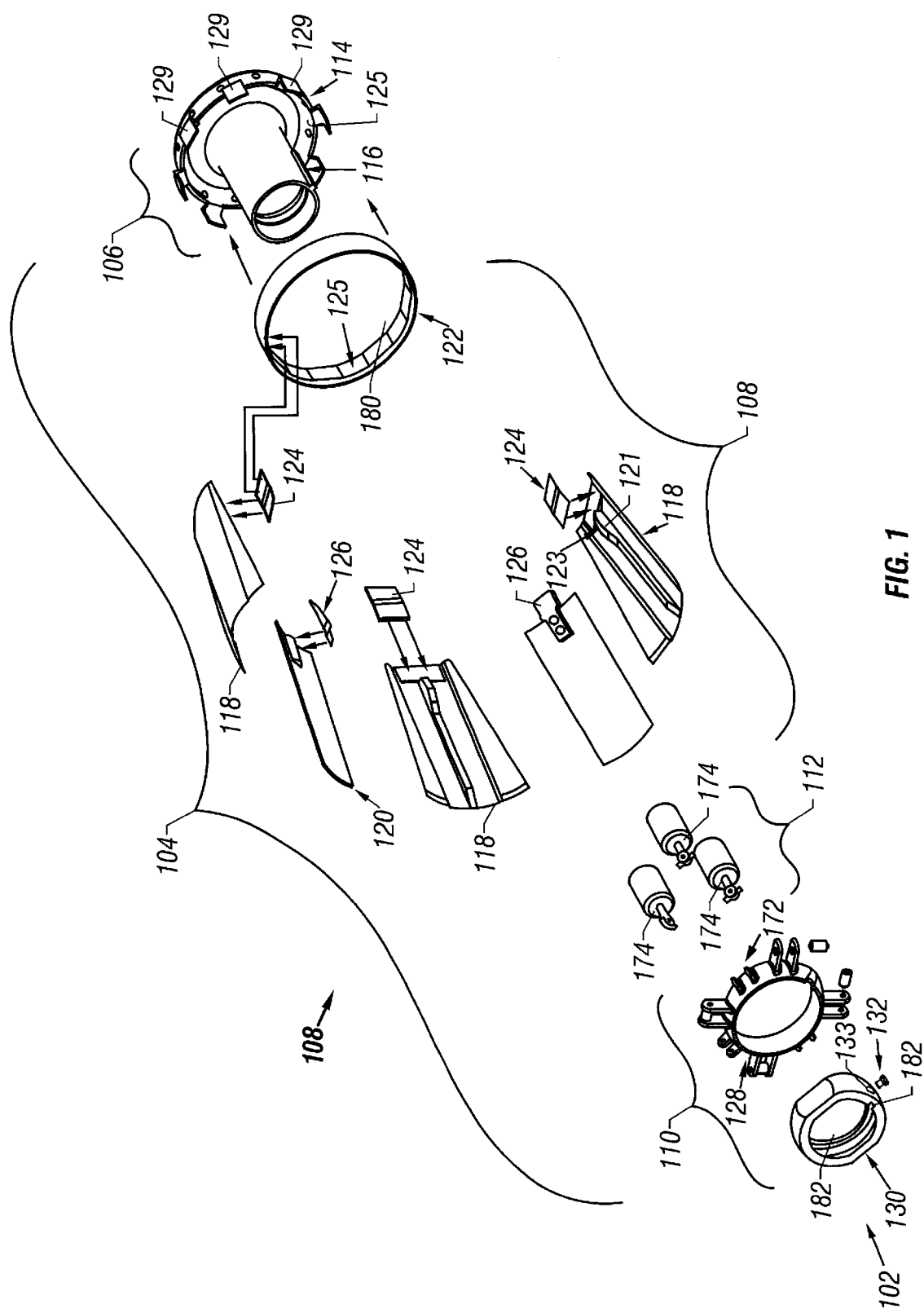
FIG. 1 and FIG. 2 are an exploded, isometric view and an isometric, assembled view, respectively, of one particular embodiment of an apparatus in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Figure 2:
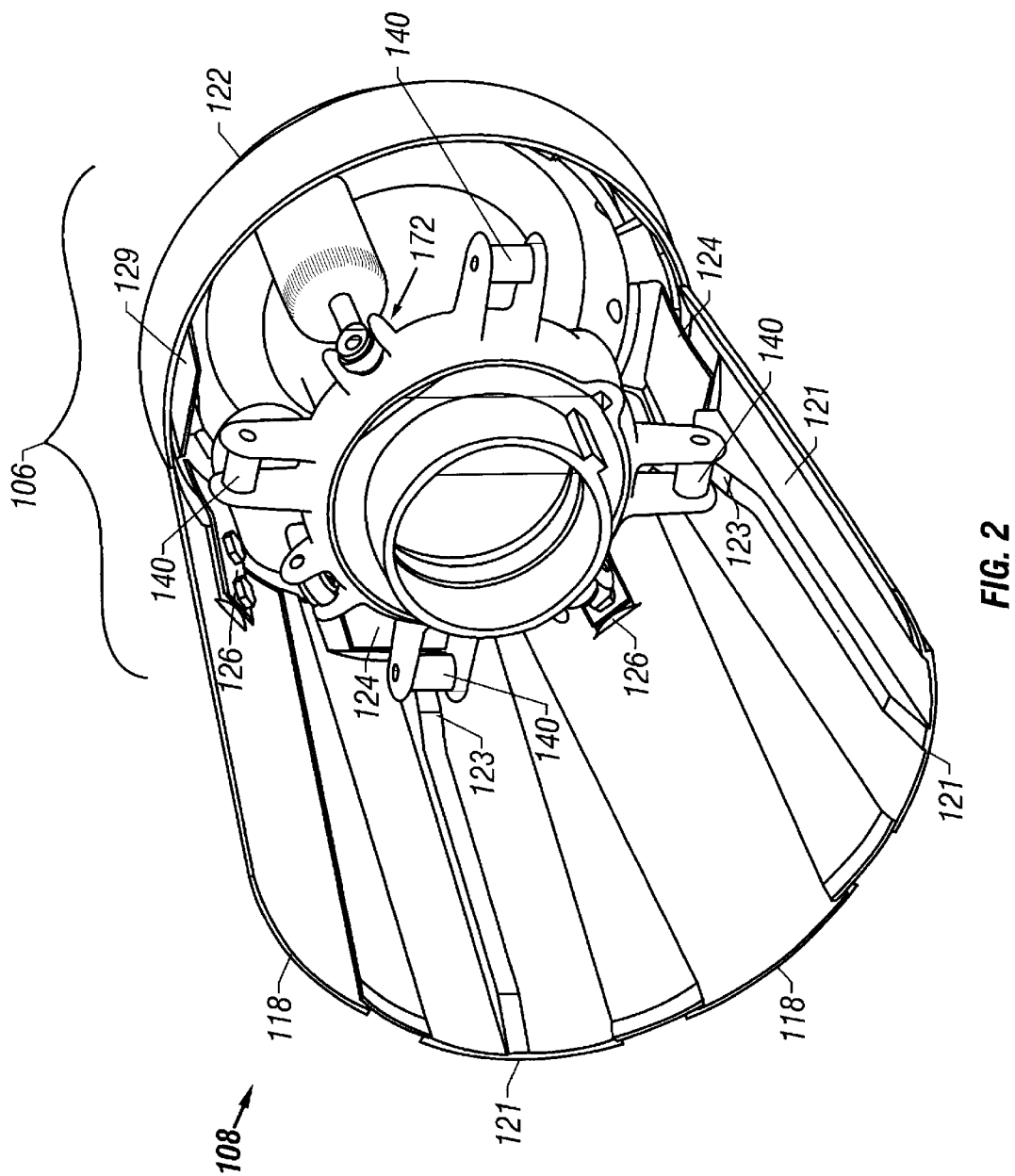

FIG. 1 and FIG. 2 illustrate one particular embodiment of an apparatus 100 producing maneuver control and center-of-pressure control with a flared surface actuated by a planar device in accordance with the present invention. The particular embodiment illustrated is capable of controlling the center-of-pressure, pitch, and yaw of a vehicle, although the invention is not so limited. In alternative embodiments, any one or two of these three controls may be implemented. Furthermore, the illustrated control method and apparatus are applied to a missile. However, in alternative embodiments, the control system may be used with a torpedo, a guided munition, or some other type of vehicle traveling through a fluid employing a movable flared surface and a planar actuation device in accordance with this invention. Consequently, the illustrated embodiment is intended for use in an atmosphere, but alternative embodiments may be used in other fluid media such as water or plasma.

Turning now to the drawings, FIGS. 1, 2 are:

an exploded, isometric view of one particular embodiment of an apparatus 100 in accordance with the present invention; and an isometric assembled view of the embodiment of FIG. 1 from the perspective indicated by the arrow 102 in FIGS. 1, 2.

The apparatus 100 comprises a surface control mechanism 104 and a load bearing structure 106. Generally speaking, in the illustrated embodiment, the surface control mechanism 104 includes a flare 108, a planar yoke mechanism 110, and a plurality of actuators 112. Likewise, the load bearing structure 106 includes a load bearing member 114 and, in the illustrated embodiment, an anti-roll key 116. The surface control mechanism 104 imparts a moment to the vehicle (not otherwise shown) through the load bearing structure 106 in a manner described more fully below.

Figure 3:
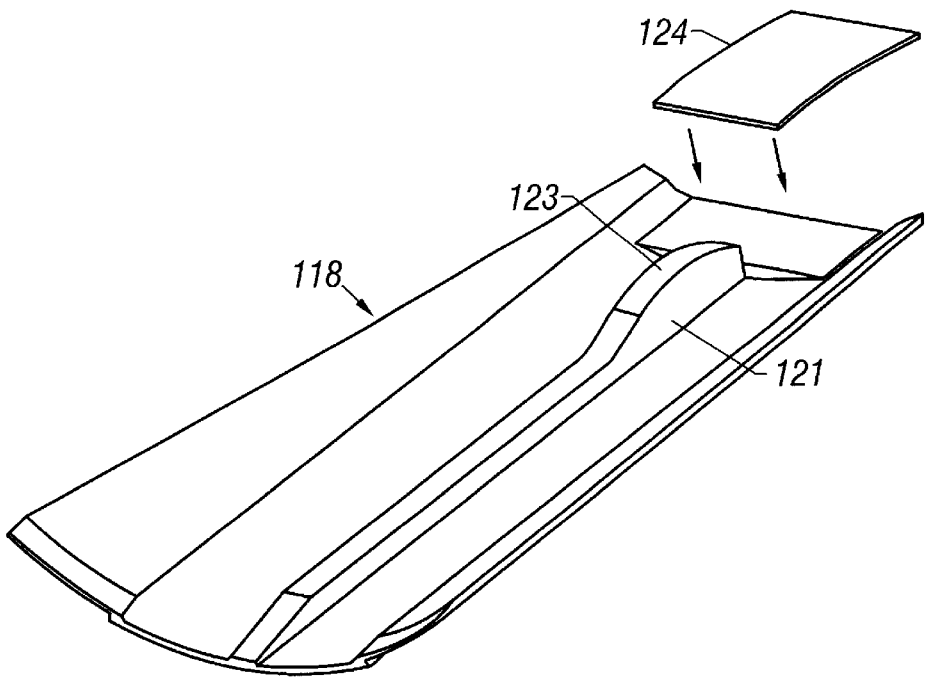
FIGS. 3–5 illustrate selected parts of the flare of the embodiment in FIG. 1 in enlarged, exploded, isometric views.
Figure 4:
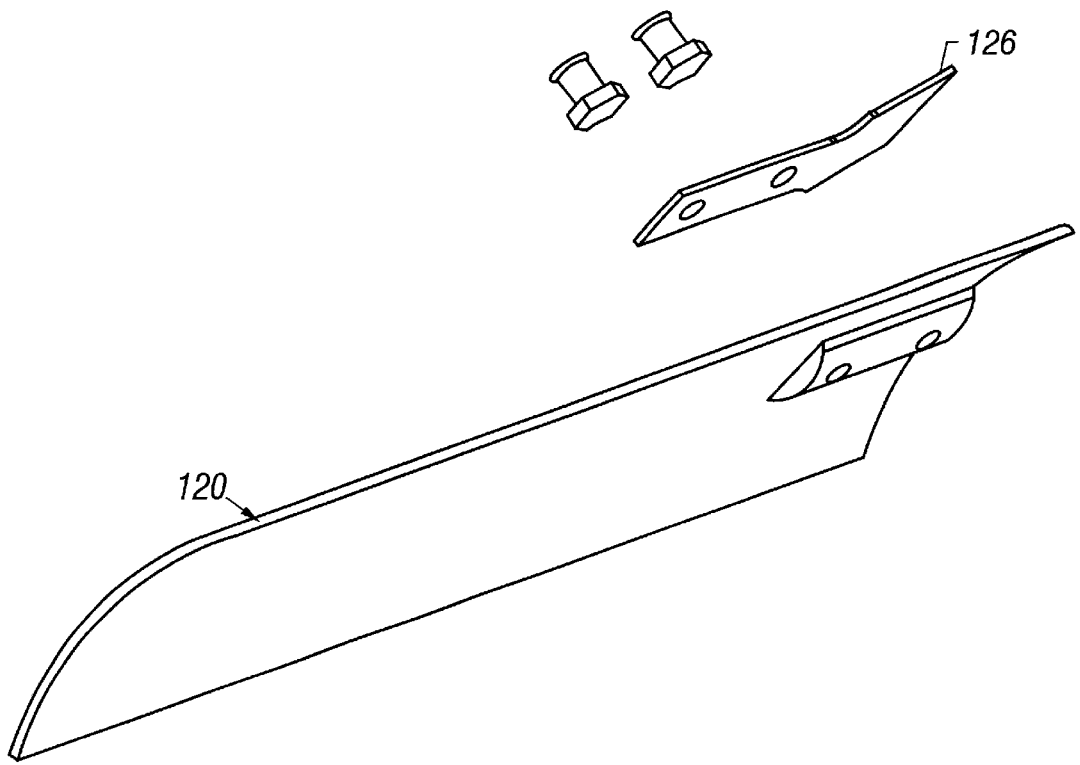
Figure 5:
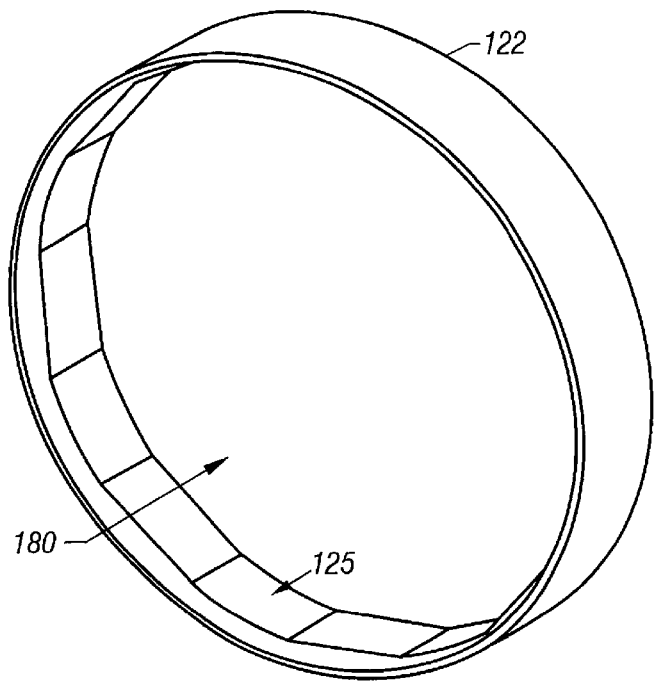

Referring now to FIG. 1 and FIG. 2, the flare 108 more particularly comprises:

- a plurality of active petals 118, shown in FIG. 3 in an enlarged, exploded view,
- a plurality of passive petals 120, shown in FIG. 4 in an enlarged, exploded view,
- an attachment ring 122, shown in FIG. 5 in an enlarged view,
- a plurality of active petal hinge springs 124, shown in FIG. 3, and
- a plurality of passive petal hinge springs 126, shown in FIG. 4.

One particular embodiment of the invention employs eight total petals—four active petals 118 and four passive petals 120. Note, however, that the passive petals 120 may be omitted in some alternative embodiments and, in some of these alternative embodiments, only a single active petal 118 might be employed. Returning to FIG. 1, the active petals 118 include an active petal guide 121 which is, in the illustrated embodiment, an extruded inclined surface 123.

Each of the petals 118, 120 is attached at one end thereof to the attachment ring 122 by a respective spring 124, 126. At least one active petal hinge spring 124 and at least one passive petal hinge spring 126 is affixed between each of the respective petals 118, 120 and the attachment ring 122. The hinge springs 124, 126 may be attached to the petals 118, 120 and to the attachment ring 122 using any suitable technique known to the art. Exemplary techniques include bolting, welding, or adhering the springs 124, 126. In the illustrated embodiment, the passive petal hinge springs 126 are bolted and the active petal hinge springs 124 are welded. Note that the springs 124, 126 may be attached using the same technique in alternative embodiments. The hinge springs 124, 126 are attached to an interior surface 125 of the attachment ring 122 also as is best shown in FIG. 2.

The hinge springs 124, 126 are, by way of illustration and example, but one means for attaching the petals 118, 120 to the attachment ring 122. The petals 118, 120 may be attached to the attachment ring 122 in alternative embodiments by, for instance, a plurality of hinges. Any suitable means permitting movement of the petals 118, 120 relative to the rocket motor casing (not shown) in the manner described herein may be used.

The attachment ring 122 of the flare 108, and hence the flare 108, is mounted to the load bearing member 114 of the load bearing structure 106, as is best shown in FIG. 2. Note that, in some alternative embodiments, the attachment ring 122 might comprise a portion of the load bearing structure 106. In these alternative embodiments, the attachment ring 122 might even be integral therewith, i.e., the attachment ring 122 and the load bearing structure 106 might form a single piece. In the illustrated embodiment, an edge of the load bearing structure 106 is castellated as is best shown in FIG. 1. The resulting feet 129 are attached to the faceted interior surface 125 of the attachment ring 122 to mount the attachment ring 122 to the load bearing structure 106.

Figure 6:
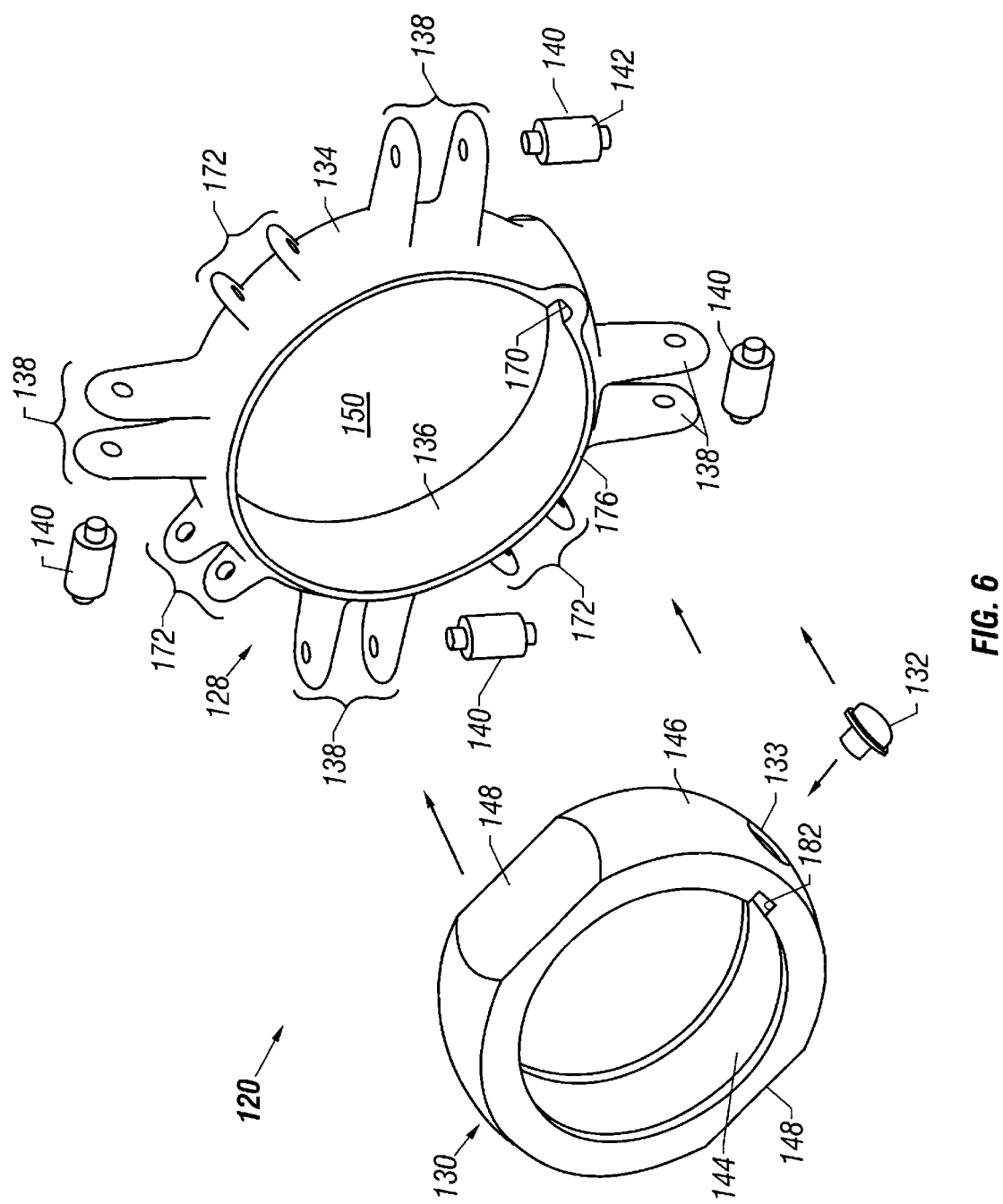
FIG. 6 illustrates selected parts of the planar yoke mechanism of the embodiment in FIG. 1 in an enlarged, exploded, isometric view.

Returning to FIG. 1, the planar yoke mechanism 110 comprises a planar yoke 128, a bearing ring 130, and an anti-roll pin 132, as is best shown in FIG. 6. Referring now to FIG. 6, the planar yoke 128 includes an outer surface 134 and a concave inner surface 136. A plurality of appendages 138 extend from the outer surface 134 of the planar yoke 128, each terminating in at least one petal interface roller 140. Note that the exterior surface 142 of the petal interface rollers 140 may be formed to mate with the transverse profile of the active petal guides 121 in some embodiments.

The bearing ring 130 includes a concave, inner surface 144 and a convex outer surface 146. The outer surface 146 includes two facets 166. The facets 166 provide clearance between the bearing ring 130 and the planar yoke 128 during assembly. The planar yoke mechanism 110 is assembled by rotating the bearing ring 130 approximately 90°, and passing it halfway through the aperture 150 of the yoke 128. The pin 132 is then positioned in an opening 133 in the bearing ring 130. The bearing ring 130 is then rotated again 90° to its original orientation, the pin 132 rotating into a groove 170 in the planar yoke 128.

When assembled, the bearing ring 130 nests inside the planar yoke 128 and provides a rotation capability for the planar yoke mechanism 110 as a whole. This rotation capability is used in controlling the pitch and yaw of the vehicle as is discussed more fully below. Thus, in some alternative embodiments in which such control is not desired, the bearing ring 130 may be omitted, provided that the interior surface 144 is then cylindrical rather than concave. The pin 132, however, prohibits the bearing ring 130 and the planar yoke 128 from rotating around the roll axis relative to one another.

Returning to FIG. 1 and FIG. 2, the planar yoke mechanism 110 is operably connected to the flare 108 via the actuators 112 in three places 172. The number of places 172 will be implementation specific. In the illustrated embodiment, three actuators 112 are employed, but alternative embodiments may employ different numbers. Each of the actuators 112 is operably connected, e.g., pinned, to the planar yoke mechanism 110 at the places 172 and affixed to the load bearing member 114. The actuators 112 in the illustrated embodiment are electro-mechanical, but may be hydraulic or pneumatic in alternative embodiments. The actuators 112 translate and rotate the planar yoke mechanism 110 by extending and retracting the arms 174 in a manner more fully discussed below.

Note that the term "planar" in the phrases "planar yoke" and "planar yoke mechanism" does not imply that the structures are themselves "planar." Although the structures may, in some embodiments, in fact be planar, they may be, e.g., convex or concave in others. Whether the structures themselves are actually planar is not material to the practice of the invention. Instead, the term "planar" implies in these phrases that the structures operate in a plane to manipulate the flare 108. In the illustrated embodiment, the face 176 of the planar yoke 128 is, indeed, planar, but could just as easily be convex or concave. However, the planar yoke 128 operates in a plane through translation or rotation responsive to the actuators 112 to manipulate the flare 108.

The actuators 112 are capable of displacing the planar yoke 128. The illustrated embodiment employs three places 172 but may, in some implementations, displace the planar yoke mechanism 110 at as few as one and as many as fifty places. As will be recognized by those skilled in the art having the benefit of this disclosure, the ability to use many actuators 112 as well as few actuators 112 adds flexibility to the actuator selection process. The yoke 128 may be any suitable planar member and, in this particular embodiment, is a rigid, uniform, aluminum ring. However, it is not necessary to the practice of the invention that the yoke 128 be a ring, as other geometries may be used. The planar yoke 128 may even in some embodiments, be a solid planar member. Similarly, materials other than aluminum may be used.

Figure 7:
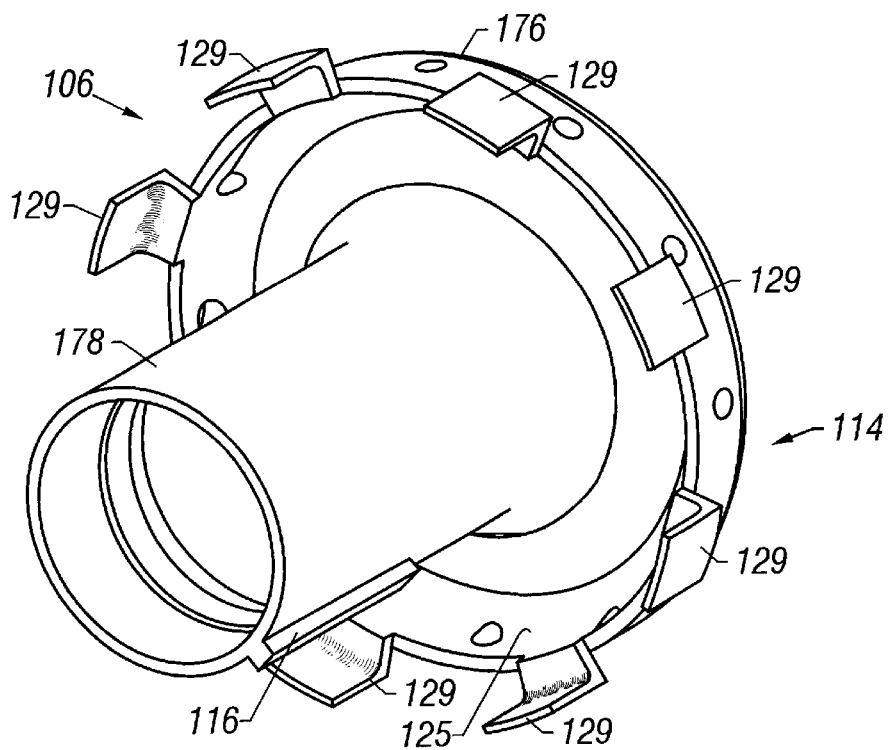
FIG. 7 illustrates the load bearing structure of the embodiment in FIG. 1 in an enlarged isometric view.

The load bearing structure 106 includes a load bearing member 114, that comprises a cap 176 and a barrel 178, shown best in FIG. 7. In the illustrated embodiment, the apparatus 100 is intended for use in a missile (not otherwise shown). The cap 176 comprises a portion of the aft pressure dome of the rocket motor (not shown) and the barrel 178 comprises a blast tube between the rocket motor and the nozzle (also not shown). However, this particular design for the load bearing structure 106 is not necessary to the practice of the invention. For instance, as those in the art having the benefit of this disclosure will appreciate, a missile would ideally omit a blast tube and feed the nozzle directly from the rocket motor through the aft pressure dome to maximize performance. However, engineering and design constraints typically sacrifice some performance to include the blast tube 178. Thus, in some embodiments, the blast tube 178 might be altogether omitted. The load bearing structure 106 may be, in some embodiments, a completely separate structure from the nozzle (not shown) or the blast tube 178. Note also that the design of the load bearing structure may vary depending on the type of vehicle in which it is being implemented.

Still referring to FIG. 1 and FIG. 2, the actuation mechanism 104 is mounted to the load bearing structure 106 by mounting the attachment ring 122 and affixing the actuators 112 to the cap 176 of the load bearing structure 106. The blast tube 178 extends through the apertures 180, 150, 182 (shown best in FIG. 1) in the attachment ring 122, planar yoke 128, and bearing ring 130, respectively. The anti-roll pin 132 of the bearing ring 130 fits through a groove 170 in the interior surface 136 of the planar yoke 128. The groove 182 fits over the anti-roll key 116 on the blast tube 178. The apparatus 100 is, in this particular embodiment, thereby "locked" to prevent any rotation in the roll axis of the vehicle. Note, however, that the length of the anti-roll key 116 on the blast tube 178 still permits the planar yoke mechanism 110 to move longitudinally relative to the load bearing structure 114. This permits the translation and rotation of the planar yoke mechanism 110 used to control the center-of-pressure and/or pitch and/or control of the vehicle, but prevents the planar yoke mechanism 110 from rotating about the vehicle roll axis.

Figure 8A:
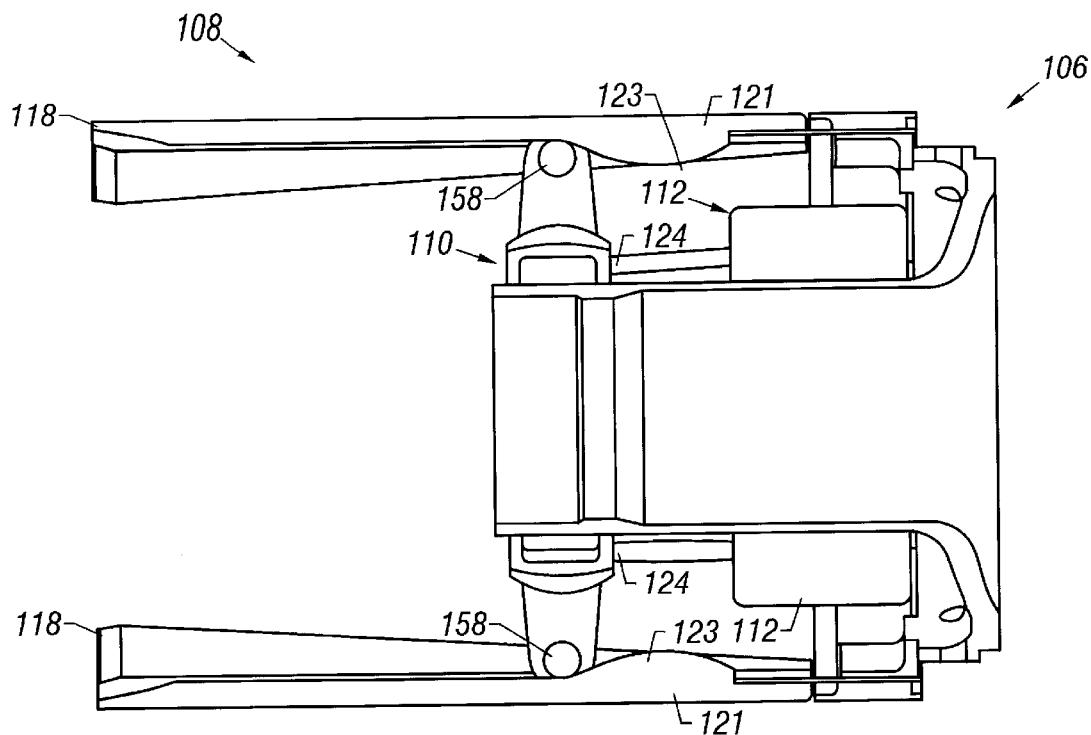
FIGS. 8A–8D illustrate the cycle through which the flare is deflected and returned to its undeflected position, FIGS. 8A–8C being side cross-sectional views and FIG. 8D being an aft, plan view.
Figure 8B:
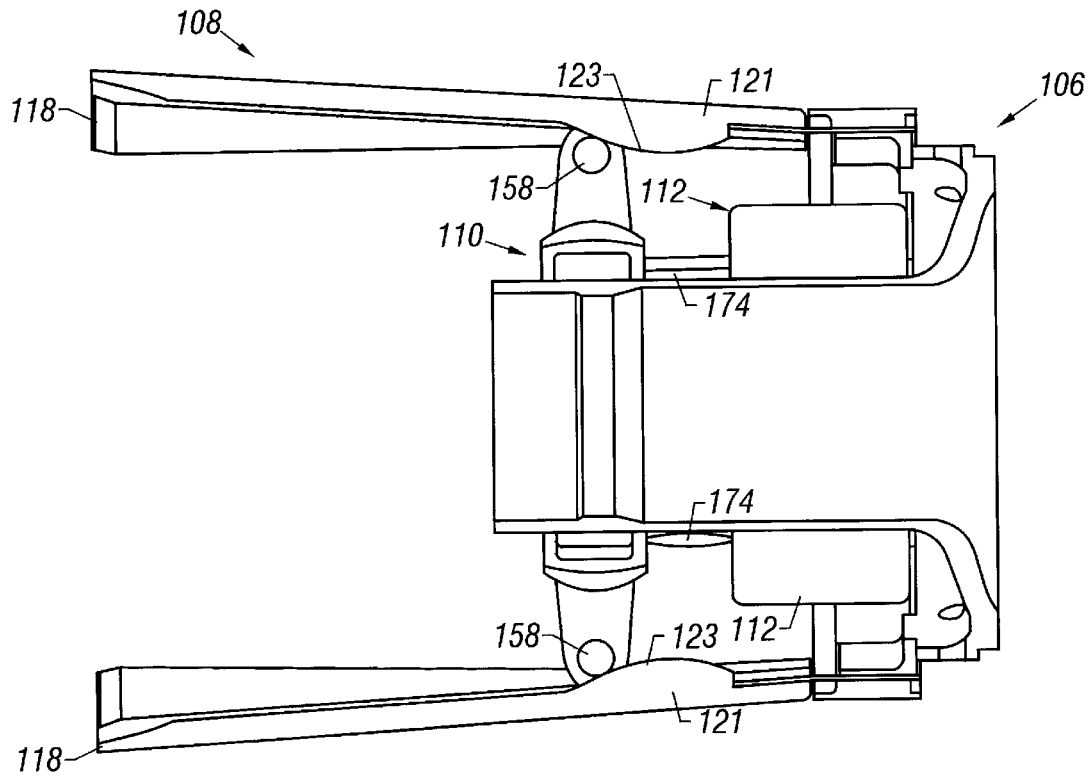
Figure 8C:
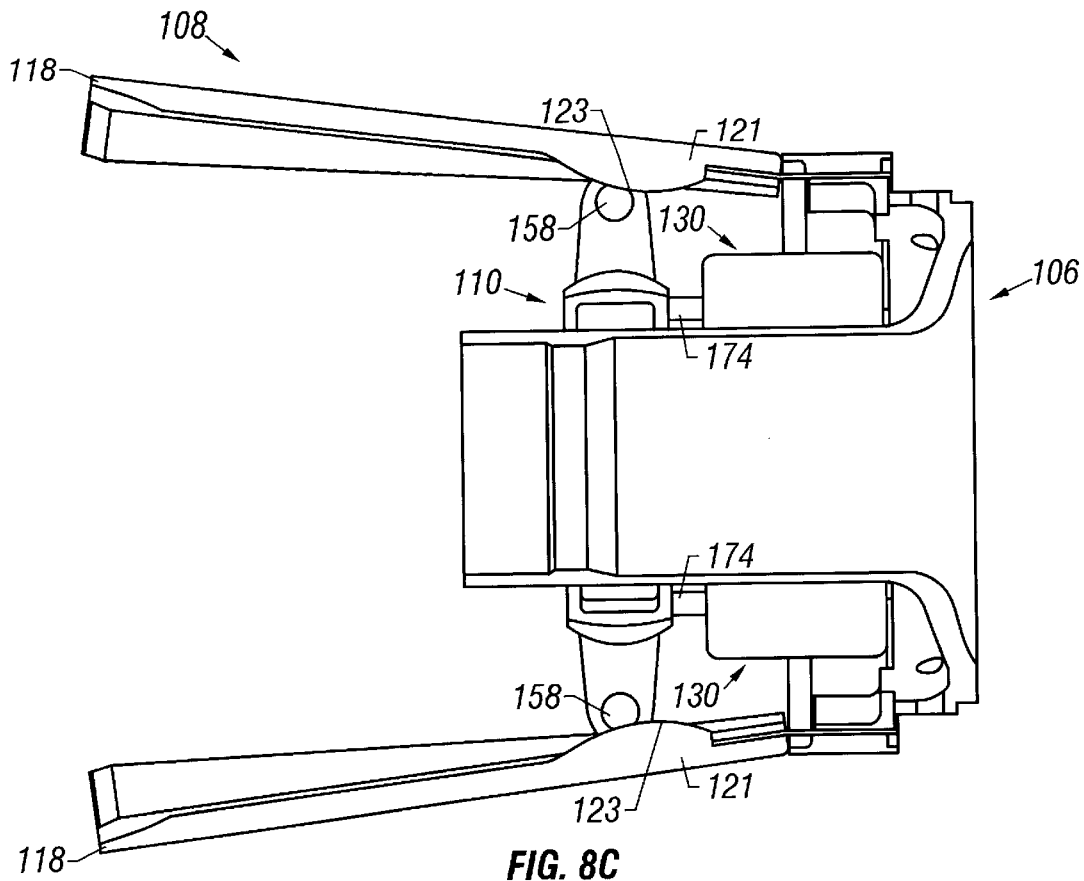
Figure 8D:
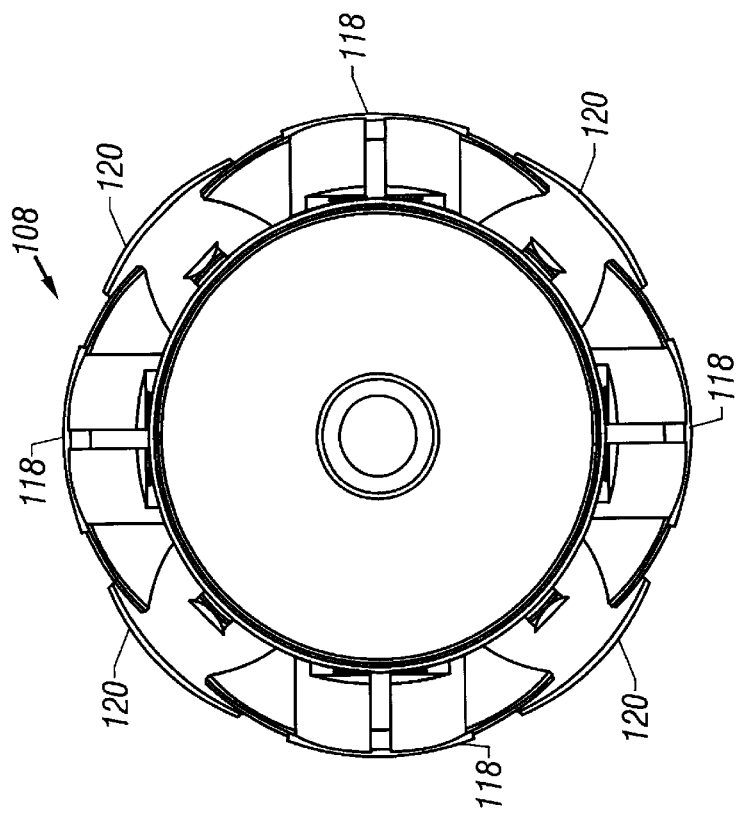

FIGS. 8A–8D illustrate the cycle through which the flare 108 is deflected and returned to its undeflected position, FIGS. 8A–8C being side cross-sectional views and FIG. 8D being an aft, plan view. When the apparatus 100 is assembled, the actuators 112 translate and/or rotate the planar yoke mechanism 110 by extending and retracting the arms 174. Assuming the flare 108 begins in a closed position shown in FIG. 8A, the petal interface rollers 140 contact the extruded, inclined surface 123 of the active petal guides 121. As the arms 174 retract, the petal interface rollers 140 roll "up" the active petal guides 121 to raise the active petals 118 relative to the airframe against the force of the springs 124. The passive petals 120 overlap the active petals 118 as is best shown in FIG. 8D, and are raised in concert with the motion of the active petals 118, thus overcoming the force of the springs 126 and the force of the aerodynamic load. As the arms 174 continue to retract, the rollers 140 continue to follow the included surface 123 until the flare 108 is fully opened, as shown in FIG. 8C. As the arms 174 extend, the petal interface rollers 140 roll "down" the active petal guides 121 to lower the active petals 118 responsive to the force of the springs 124, 126 relative to the airframe and the aerodynamic load. As the active petals 118 lower, the flare 108 becomes partially closed as shown in FIG. 8B and then closes as shown in FIG. 8A. Depending on the control desired, the flare 108 may be opened and closed in this manner in any continuum from fully closed to fully opened.

Figure 9A:
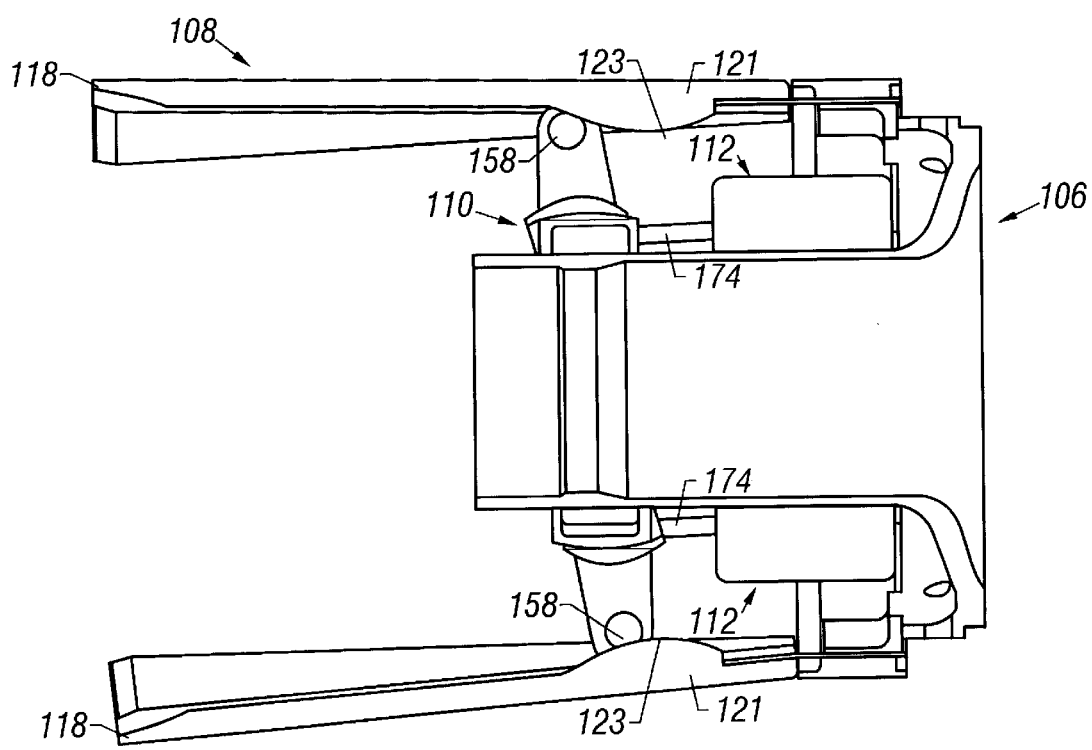
FIGS. 9A–9C illustrate the cycle through which the flare is deflected to effect control in pitch only, FIGS. 9A–9B being side cross-sectional views and FIG. 9C being an aft, plan view.
Figure 9C:
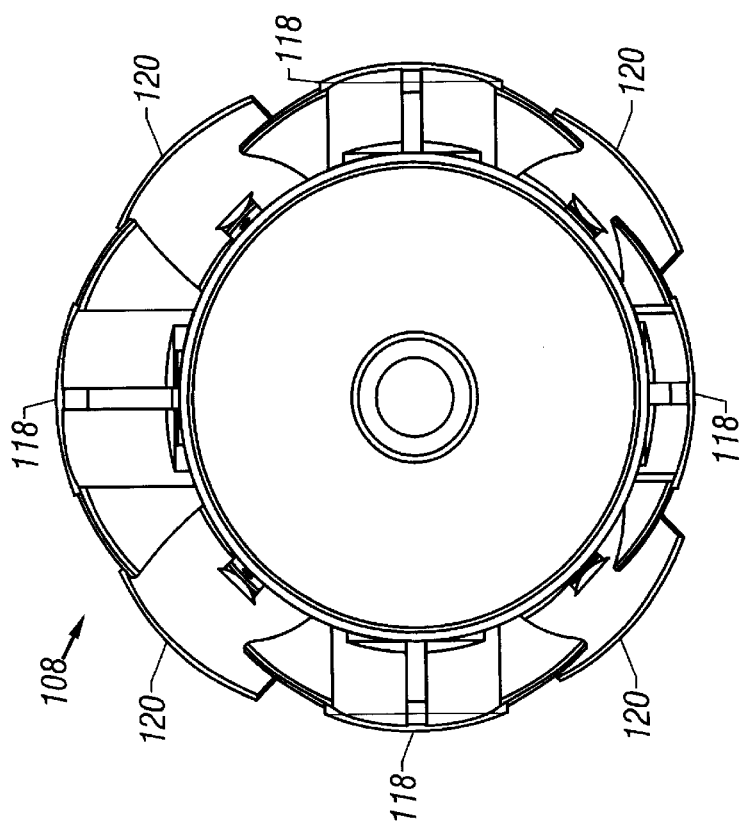
Figure 9B:
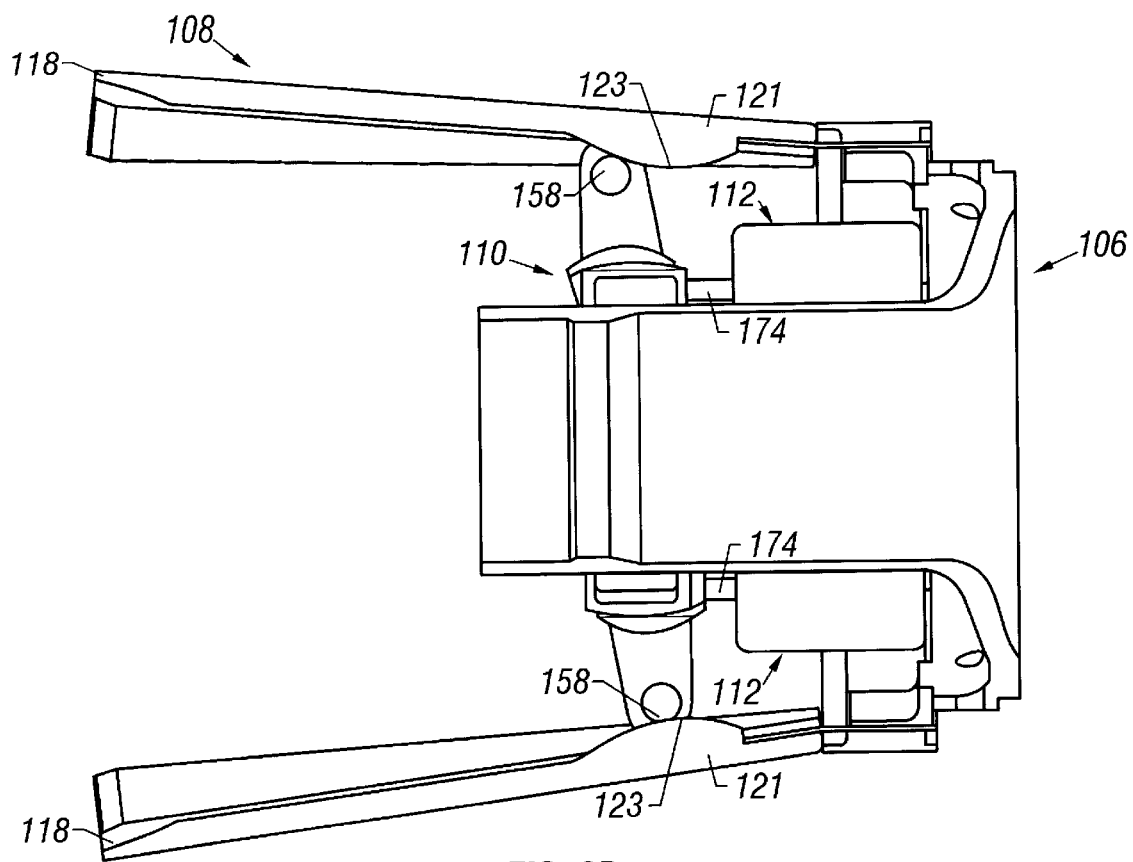

Note that the actuators 112 can be independently controlled in this particular embodiment so that the active petals 118 can be deflected in an asymmetrical fashion. FIGS. 9A–9C illustrate the flare 108 opened asymmetrically to effect control in pitch, but not yaw. FIG. 9A depicts the flare 108 partially opened and FIG. 9B depicts the flare 108 fully opened. The flare 108 could also be controlled similarly to effect control in yaw only, or to control center-of-pressure, although this is not shown.

In an alternate embodiment not shown, the springs 124 and 126 can be formed so as to hold the petals 118, 120 in an open, or over-extended, position in the absence of an aerodynamic load. Such a configuration may be used to provide additional, early stabilization upon immediate exit of a launch canister. As pressure forces increase due to accelerating motion through a fluid medium, the active and passive petals 118, 120 would eventually be forced into contact with the planar yoke mechanism 110.

The operation of the apparatus 100 to control the center-of-pressure, pitch, and yaw of a vehicle will now be more fully discussed relative to FIGS. 10A–10C and 11A–11C. FIGS. 10A–10C illustrate control of the vehicle's center-of-pressure and FIGS. 11A–11C illustrate control of pitch and/or yaw. More particularly:

FIG. 10A depicts the flare 108 undeflected, FIG. 10B depicts the flare 108 deflected to control the center-of-pressure for a possible nominal center-of-pressure location, and FIG. 10C compares the shape of the flare 108 when undeflected to the shape of the flare 108 when deflected from the perspective of the arrow 183 in FIGS. 10A, 10B; and FIG. 11A depicts the flare 108 undeflected, FIG. 11B depicts the flare 108 deflected to control the pitch and/or yaw from the nominal center-of-pressure location, and FIG. 11C compares the shape of the flare 108 when undeflected to the shape of the flare 108 when deflected from the perspective of the arrow 184 in FIGS. 11A, 11B.

These drawings are conceptualized illustrations of the embodiment of FIGS. 1, 2. Numerous details discussed above and presented in other drawings are omitted so as not to obscure the invention and to further an understanding thereof. For instance, the petal interface rollers 140 are not shown in these drawings even though they are present and function as described above relative to FIGS. 1, 2. Note, however, that alternative embodiments might control fewer than all three of these characteristics.

Referring now to FIGS. 10A–10C, control of the vehicle's aerodynamic center-of-pressure is achieved by longitudinal motion of the planar yoke mechanism 110. FIG. 10A conceptually illustrates in a plan, sectional view that the flare 108 is undeflected. The term "undeflected" means, in this context, undeflected relative to the rocket motor casing 186. The shape of the flare 108, as seen from the direction of the arrow 183, is represented by the broken, circular line 188 in FIG. 10C. The planar yoke mechanism 110 is then translated longitudinally from a first position 190 represented in FIG. 9B in broken lines to a second position shown as illustrate by the arrow 192. The planar yoke mechanism 110 interacts with the active petals 118 to deflect them relative to the rocket motor casing 186 in the manner described above. The shape of the flare 108 is conceptually illustrated in FIG. 10C as deflected by the solid line 194. Note that the active petals 118 are deflected symmetrically by the longitudinal translation.

More particularly, referring to FIGS. 1, 2 and 10A–10C, the actuators 112 retract the arms 174 translating the planar yoke mechanism 110 toward the forward direction of the vehicle (represented by the arrow 192). The actuators 112 could react against the attachment ring 122 or the load bearing structure 106. The planar yoke mechanism 110 translates forward while the petal interface rollers 140 move along the active petal guides 121. The planar yoke mechanism 110 is restrained in the roll axis by the anti-roll key 116 and the anti-roll pin 132.

The active petals 118 move to increase inclination divergent to the longitudinal axis 193, or to "flare" out. The passive petals 120 overlap the active petals 118. The pressure of the active petals 118 against the passive petals 120 combined with aerodynamic pressure against the outside surface of the passive petals 120 creates an aerodynamic seal. This action to increase inclination moves the aerodynamic center-of-pressure aft along the longitudinal axis 196. The active petals 118 and passive petals 120 are hinged to the attachment ring 122 by the hinge springs 124 and 126 respectively. The passive petal 120 is attached to its hinge springs 126 in such a manner that it may twist along the passive petal 120's roll axis.

Referring now to FIGS. 11A–11C, control of the vehicle's pitch or yaw motion is performed by a rotation of the planar yoke member 120. FIG. 11A conceptually illustrates in a plan, sectional view that the flare 108 is symmetrically deflected. The shape of the flare 108, as seen from the direction of the arrow 184, is represented by the broken, circular line 198 in FIG. 11C. The planar yoke mechanism 110 is then rotated from the first position 200 represented in broken lines to the second position shown in solid lines. This is done by translating it longitudinally at less than all the possible translation points. In FIGS. 11A–11C, this occurs at a single point, i.e., a single actuator 112 (shown in FIGS. 1, 2). The planar yoke mechanism 110 interacts with the active petals 118 to deflect them relative to the rocket motor casing 186 as described above. The shape of the flare 108 is conceptually illustrated in FIG. 11C as deflected by the solid line 202. Note that the active petals 118 are deflected in an asymmetrical fashion by the partial longitudinal translation, i.e., the rotation.

It will be evident to those skilled in the art that performing a maneuver in yaw is identical to performing a maneuver in pitch by rotating actuation plane by 90°. More particularly, the actuators 112 move differentially to rotate the yoke 128 about the bearing ring 130. The anti-roll pin 132 may twist about an axis normal to the vehicle longitudinal axis to allow all combinations of pitch and/or yaw commands. The differential movement of the yoke 128 creates differential movement of the petal interface rollers 140 against the opposing petals 118. This causes asymmetric inclination of the active petals 118 and passive petals 120 with respect to the vehicle axis. The differential load is transferred through the planar yoke mechanism 110 onto a load bearing structure 106. This asymmetric motion of the flared petals causes an asymmetric pressure distribution of aerodynamic load, causing an aerodynamic pitch and/or yawing moment to maneuver the vehicle. The passive petals 120 twist along their roll axes to maintain aerodynamic sealing against the active petals 118.

Note that, in the FIGS. 10A–10C and 11A–11C, the amount of deflection is exaggerated to more clearly convey the invention. The deflection is illustrated at approximately 30° relative to the rocket motor casing 186. More typical deflections might be approximately 8°, although 30° might actually be employed in some embodiments. The precise amount of deflection is not material to the practice of the invention. As those in the art having the benefit of this disclosure will appreciate, the amount of deflection will be implementation specific and specific to certain operational conditions. The factors influencing the amount of deflection in any given implementation or circumstance are well known to those in the art. Exemplary factors include, but are not limited to, flight speed, center-of-gravity location, desired stability level, and desired maneuverability response time.

As will be apparent to those in the art having the benefit of the disclosure, the invention contemplates some variation of certain structures among the many possible embodiments. Embodiments of the surface control mechanism alternative to those discussed above are contemplated and are considered to be within the scope and spirit of the invention as claimed below. Exemplary alternative embodiments are illustrated in FIGS. 12–17 and are discussed below. However, still other alternative embodiments may be implemented.

Figure 12:
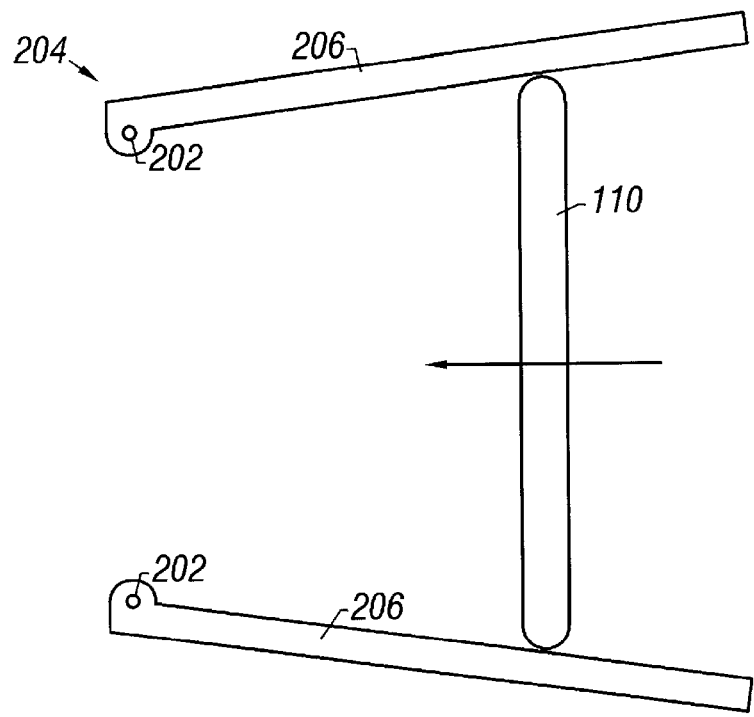

FIG. 12 conceptually illustrates an alternative embodiment 204 that omits the active petal guides 121 on the active petals 118 of the embodiment 100. Instead, the active petals 206 are inclined relative to the rocket motor casing (not shown) in an undeflected position. The planar yoke mechanism 110 is translated or rotated to deflect the active petals 206 in the same manner as for the active panels 111 in the embodiment 100. The active petals 206 and the passive petals (not shown in FIG. 12) form an aerodynamic seal in the same fashion. However, because the active petals 206 are inclined relative to the longitudinal axis of the vehicle, the extruded, inclined surface of the active petal guides 121 in the embodiment 100 may be omitted. Note also that the active petals 206 are attached at a hinge 207 rather than by springs.

Figure 13:
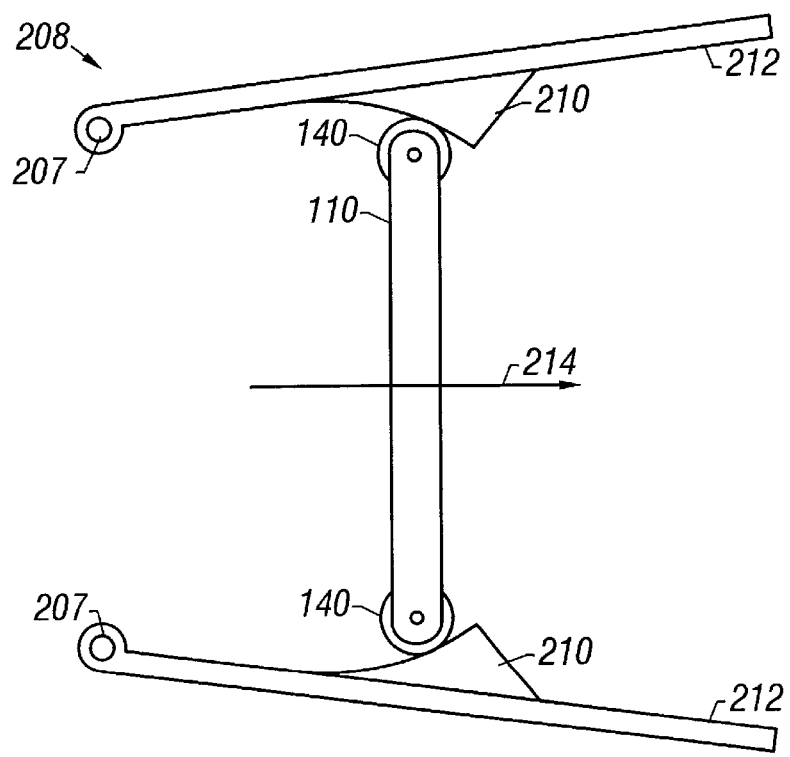

FIG. 13 conceptually illustrates an embodiment 208 in which the positions of the active petal guides 210 and the planar yoke mechanism 110 are reversed along the vehicle's longitudinal axis relative to the embodiment 100. Note that the inclination of the inclined surface of the active petal guide 210 is reversed relative to the inclined surface of the active petal guide 121 in the embodiment 100. Consequently, the rotation and translation to deflect the active petals 212 is also reversed. That is, the planar yoke mechanism 110 is pulled toward the aft of the vehicle (as indicated by the arrow 214) to deflect the active petals 212 and pushed toward the front of the vehicle to restore them to their undeflected position.

Figure 14:
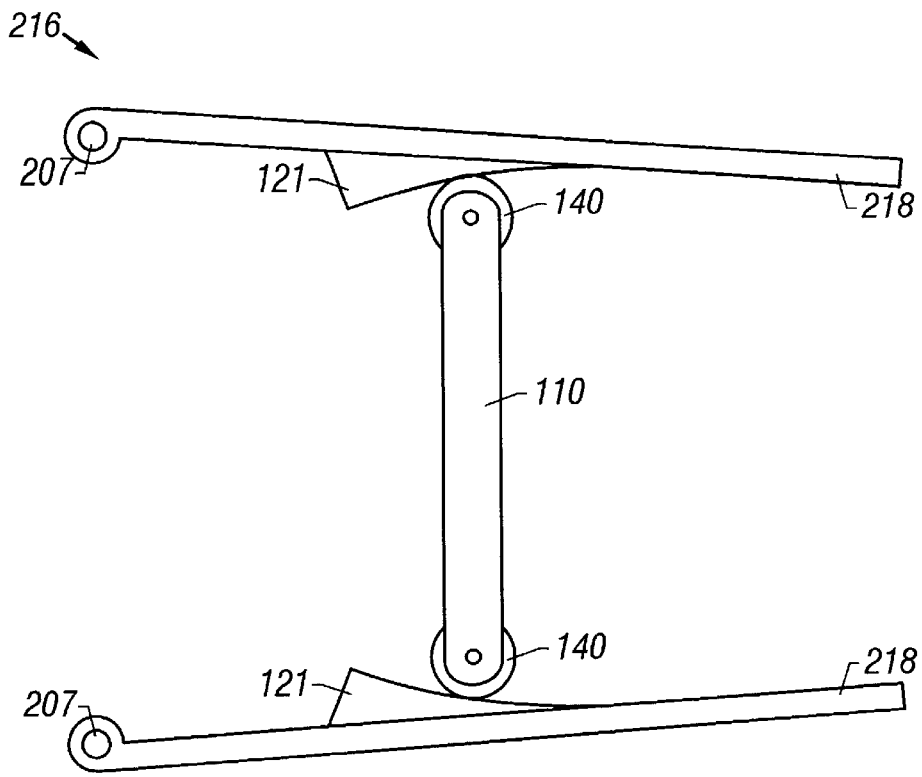

FIG. 14 conceptually illustrates an embodiment 216 in which the planar yoke mechanism 110 is translated and rotated to form what is known as a "boattail". The active petals 218 include the active petal guides 121 just as the active petals 118 in the embodiment 100, but are inclined inwardly relative to the rocket motor casing (not shown) in an undeflected position. The planar yoke mechanism 110 is then translated and rotated in the same manner as in the embodiment 100 to deflect the active petals 218.

Figure 15:
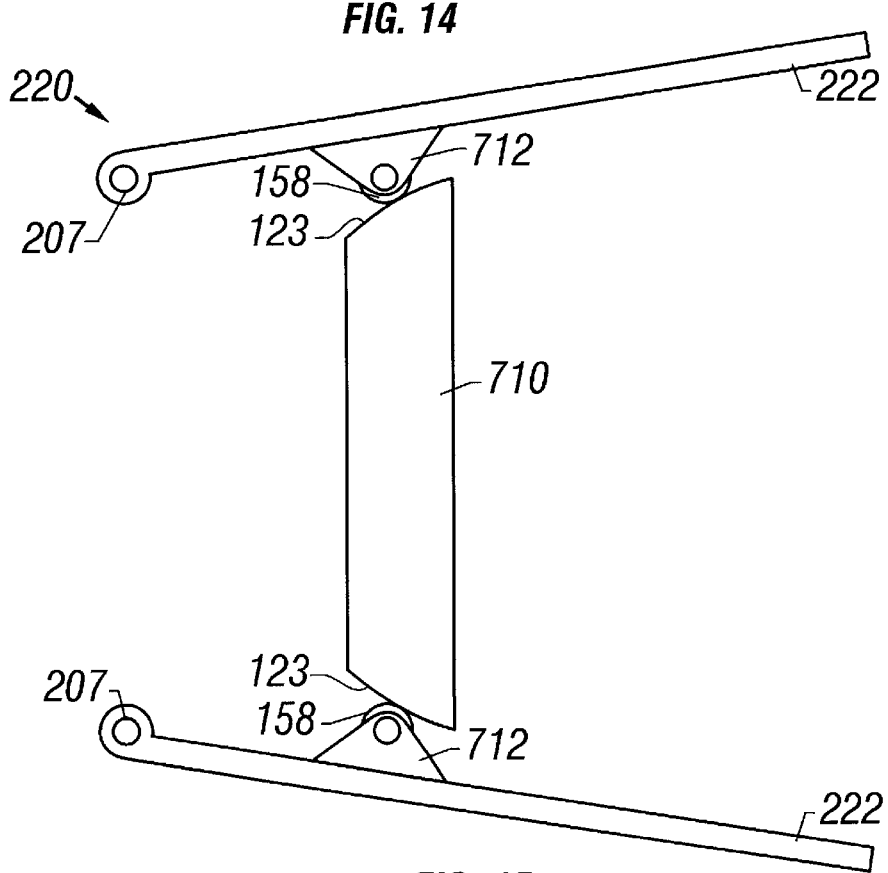

FIG. 15 conceptually illustrates an embodiment 220 in which the petal interface rollers 140 of the planar yoke 120 in the embodiment 100 can be instead included on the active petals 222. The inclined surface 123 of the active petal guides 121 in the embodiment 100 of FIGS. 1, 2, and 3 are included on the planar yoke mechanism 710 instead of the active petals 118.

Figure 16:
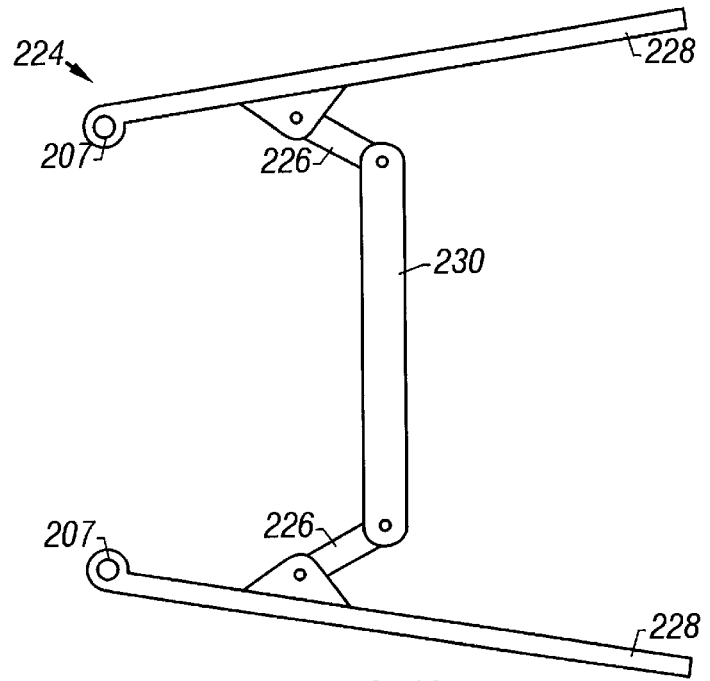
FIGS. 12–18 each conceptually illustrate various alternative embodiments.

FIG. 16 conceptually illustrates an embodiment 224 in which a plurality of links 226 deflect the active petals 228 instead of the active petal guides 121 and the petal interface rollers 140 of the embodiment 100. The link 226 may be pinned to both the planar yoke mechanism 230 and the active petals 228. Alternatively, the link 226 may be joined to one or both of the planar yoke mechanism 230 and the active petals 228 by a ball-and-socket joint (not shown). As noted above, a typical deflection might approximate 8°, and so either of these types of joints should provide sufficient freedom of movement for most implementations.

Figure 17:
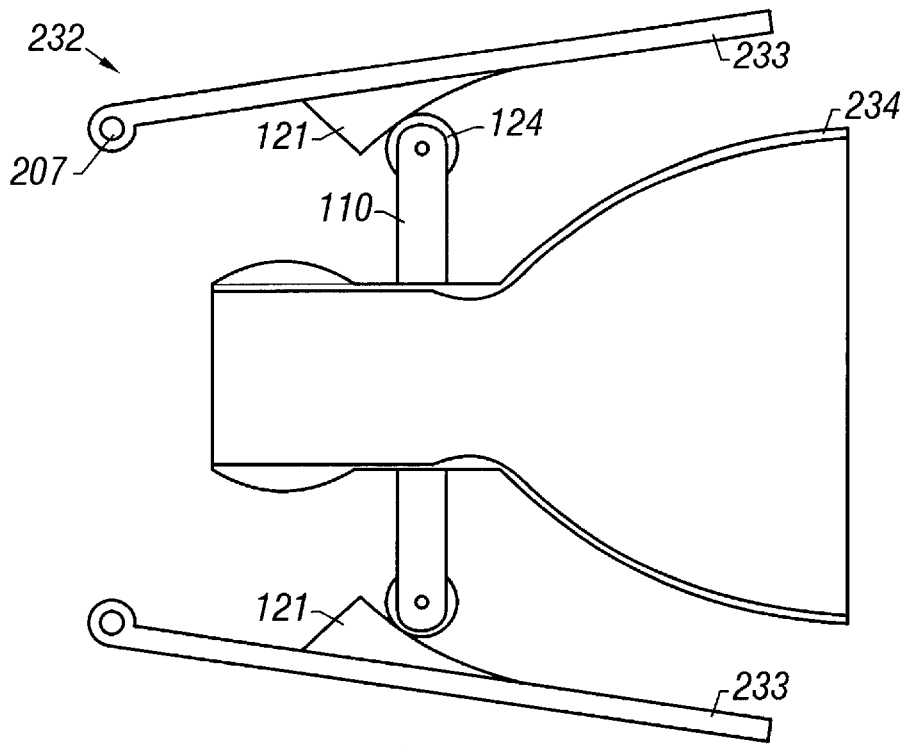

FIG. 17 conceptually illustrates an embodiment 232 in which a nozzle 234 for a longitudinal propulsive vehicle (not otherwise shown) can be coupled with a controlled flare 233 to help control the maneuvering of the vehicle. The planar yoke mechanism 110 encircles, in whole or in part, the nozzle 234. By using two actuators (not shown) to control the pitch and yaw motion of the nozzle, and one actuator (also not shown) to control the longitudinal translation of the planar yoke mechanism 110, the translation and rotation of the planar yoke mechanism 110 can be used to alter the direction of the nozzle 234. The actuators may be implemented similarly to the actuators 112 in the embodiment 100 of FIGS. 1, 2.

Figure 18:
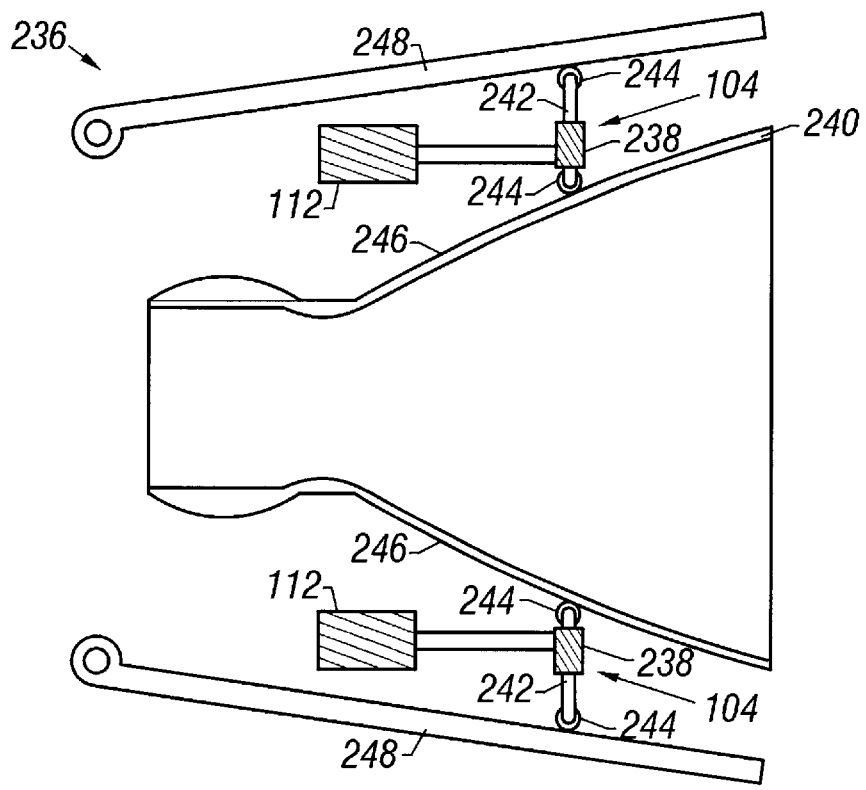

FIG. 18 illustrates yet another alternative embodiment 236, that uses the natural ramp or slope of a nozzle surface 246 to aid in deflecting the flare. The embodiment 236 includes a planar yoke mechanism 104 comprising a planar yoke 238 encircling the nozzle 240. Instead of the appendages 156 found in the embodiment 100 of FIG. 1, the embodiment 236 includes a plurality of reciprocating members 242. The reciprocating members 242 include at least one roller 244 on each end thereof. The planar yoke 238 is translated and rotated in a manner similar to the planar yoke mechanism 110 of FIG. 1. Note that, in this embodiment, the bearing ring 130 is not required for rotation. An anti-roll function can be performed by a groove configured in the flare petal and/or nozzle surface. As the planar yoke 238 is translated and/or rotated for and aft, the rollers 242 interact with the sloping or ramped outer surface 246 of the nozzle, causing the members 242 to reciprocate through an opening (not shown) in the planar yoke 238. As the members 242 reciprocate, the manipulate the active petals 248 by deflecting them outward.

Still further variation on this theme is possible. For instance, one alternative embodiment couples the rotation of the planar yoke mechanism 110 to the rotation of a nozzle by fastening the planar yoke mechanism to the nozzle and configuring the nozzle on a bearing. Another embodiment places a roller 158 or some other, similarly functioning device, positioned to reduce friction between the surfaces configured on the nozzle surface and/or petal surfaces. Thus, the various alternative embodiments of the present invention admit variation in implementation.

Thus, the invention, in the illustrated one embodiment, is an apparatus for controlling pitch, yaw and the aerodynamic center-of-pressure of a vehicle traveling through a fluid medium. The apparatus comprises a multi-position flared control surface, a planar yoke capable of rotational and translational movement and a means to resist loads normal to the longitudinal translation axis. Longitudinal motion of the planar component causes symmetric expansion or contraction of the flared component. This motion in turn causes the center-of-pressure of the vehicle to move forward or aft. Rotation of the planar component causes an expansion of the flared surface on one side and a reduction of the flared surface on the opposite side. This in turn causes an aerodynamic moment to be applied to the vehicle providing pitch and/or yaw motion of the vehicle.

The benefits of this invention, in its various embodiments and variations, include an enlargement in a total missile diameter since no external hinges or devices are required to be placed outside the main body diameter during launch as is typical with fin based, or non-movable flares. A further benefit of being able to actively control the center-of-pressure is a reduction in drag due to a flare by accommodating a controllable stability level, which in turn reduces the flare size at high speeds as the body contribution due to center-of-pressure moves aft. An additional benefit is the compact nature of the control system package that reduces weight.

This concludes the detailed description. The particular embodiments disclosed above are illustrative only, as the invention may be modified and practiced in different but equivalent manners apparent to those skilled in the art having the benefit of the teachings herein. For instance, the discussion above is generally in terms of application as an aft control device, but the invention is not so limited. The invention may also, e.g., be used to implement a forward control device. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for controlling a vehicle capable of moving through a fluid medium, the apparatus comprising:
    a flare;
    an actuation mechanism, including:
        a planar yoke mechanism operably associated with the flare; and
        a plurality of actuators capable of translating the planar yoke to manipulate the flare through the operable association therebetween; and
    a load bearing structure through which the actuation mechanism imparts a moment from the flare to the vehicle.

2. The apparatus of claim 1, wherein the vehicle is a missile, a torpedo, or a guided munition.

3. The apparatus of claim 1, wherein the fluid medium is an atmosphere, a body of water, or a plasma.

4. The apparatus of claim 1, wherein the flare includes a plurality of active petals.

5. The apparatus of claim 4, wherein the flare further includes a plurality of passive petals.

6. The apparatus of claim 4, wherein the flare further includes:
    an attachment ring; and
    a plurality of springs affixed between the active petals and the attachment ring and between the passive petals and the attachment ring.

7. The apparatus of claim 4, further wherein:
    the load bearing structure includes an attachment ring; and a plurality of springs affixed between the active petals and the attachment ring and between the passive petals and the attachment ring.

8. The apparatus of claim 4, wherein the active petals include an interior, extruded inclined surface.

9. The apparatus of claim 1, wherein the planar yoke mechanism comprises:

a planar yoke hinged to the actuators;

a bearing ring nested inside the planar yoke; and an anti-roll pin extending from the bearing ring.

10. The apparatus of claim 1, wherein the load bearing structure includes:

a load bearing member to which the actuator mechanism imparts the moment; and an anti-roll key.

11. The apparatus of claim 1, wherein the load bearing structure comprises at least a portion of an aft pressure dome of a rocket motor.

12. An apparatus for controlling a vehicle capable of moving through a fluid medium, the apparatus comprising:

a flare;

a planar yoke operably associated with the flare; and a plurality of actuators capable of moving the planar yoke to manipulate the flare through the operable association between the planar yoke and the flare; and a load bearing structure through which the planer yoke imparts a moment from the flare to the vehicle.

13. The apparatus of claim 12, wherein the flare further includes:

a plurality of active petals; and a plurality of passive petals.

14. The apparatus of claim 13, wherein the flare further includes:

an attachment ring; and a plurality of springs affixed between the active petals and the attachment ring and between the passive petals and the attachment ring.

15. The apparatus of claim 13, further wherein:

the load bearing structure includes an attachment ring; and a plurality of springs affixed between the active petals and the attachment ring and between the passive petals and the attachment ring.

16. The apparatus of claim 13, wherein the active petals include an interior, extruded inclined surface.

17. The apparatus of claim 12, wherein the planar yoke comprises:

a planar yoke member pinned to at least one actuator;

a bearing ring nested inside the planar yoke member; and an anti-roll pin extending from the bearing ring.

18. The apparatus of claim 12, wherein the load bearing structure includes:

a load bearing member to which the actuator mechanism imparts the moment; and an anti-roll key.

19. A method for controlling the maneuvering of a vehicle capable of moving through a fluid medium, the method comprising moving a planar yoke to deflect at least a portion of a flare.

20. The method of claim 19, wherein moving the planar yoke includes translating or rotating the planar yoke.

21. The method of claim 19, wherein rotating the planar yoke includes rotating a planar yoke member on a bearing ring.

22. The method of claim 19, wherein moving the planar yoke to deflect the portion of the flare includes introducing an incline in the flare relative to a rocket motor casing.

23. The method of claim 19, wherein moving the planar yoke to deflect the portion of the flare includes at least one of pushing the planar yoke toward the front of the vehicle and pushing the planar yoke toward the aft of the vehicle.

24. An apparatus for controlling a vehicle capable of moving through a fluid medium, the apparatus comprising:

an attachment ring;

a flare including at least one active petal; and means for structurally engaging the active petal to the attachment ring to permit the active petal to deflect relative to the longitudinal axis of the vehicle;

an actuation mechanism, including:

a planar yoke mechanism operably associated with the flare; and at least one of actuator capable of translating the planar yoke to manipulate the flare through the operable association therebetween; and a load bearing structure to which the attachment ring is mounted and through which the actuation mechanism imparts a moment from the flare to the vehicle.

25. The apparatus of claim 24, wherein the flare includes a plurality of active petals.

26. The apparatus of claim 24, wherein the flare further includes:

at least one passive petal; and means for structurally engaging the passive petal to the attachment ring to permit the passive petal to be deflected relative to the longitudinal axis of the vehicle.

27. The apparatus of claim 24, further wherein the attachment ring comprises one of a portion of the flare and the load bearing structure.

28. The apparatus of claim 24, wherein the active petals include an interior, extruded inclined surface.

* * * * *